UNITED STATES PATENT OFFICE.

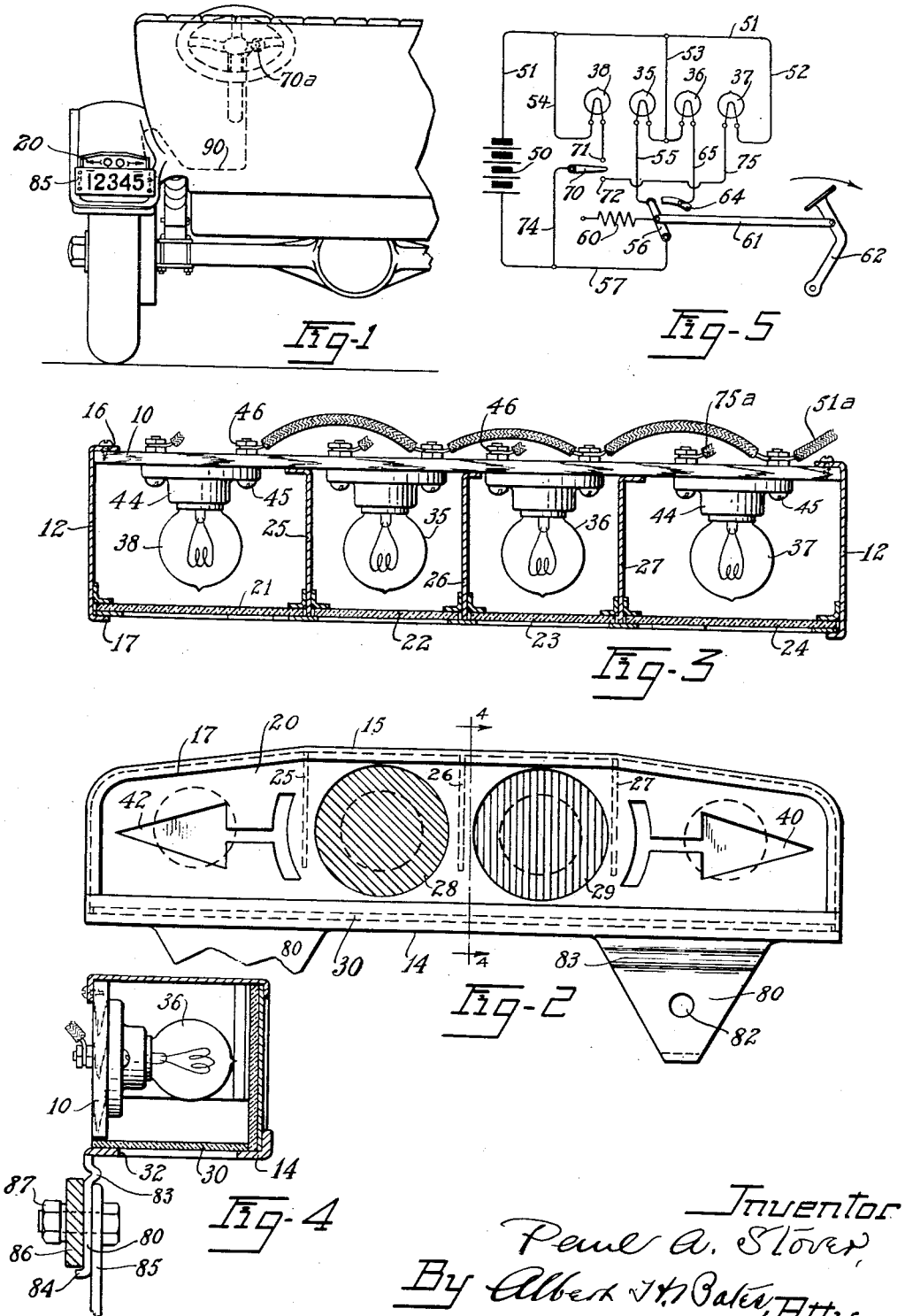

PAUL A. STOVER, OF CLEVELAND, OHIO.

AUTOMOBILE-SIGNAL.

1,300,893.  Specification of Letters Patent.  Patented Apr. 15, 1919.

Application filed October 7, 1916. Serial No. 124,270.

*To all whom it may concern:*

Be it known that I, PAUL A. STOVER, a citizen of the United States, residing at Cleveland, in the county of Cuyahoga and State of Ohio, have invented a certain new and useful Improvement in Automobile-Signals, of which the following is a full, clear, and exact description, reference being had to the accompanying drawings.

This invention relates to automobile signals, and the essential object is to provide a simple, efficient device adapted to be attached to automobiles and like vehicles for automatically indicating to those in the rear when the driver is about to stop the vehicle. A more specific object is to so arrange this indicating means that it may be illuminated and adapted to show one color when the vehicle is running normally ahead and show another color when the vehicle is about to stop, the illuminating means for both these colors being so arranged that it may conveniently illuminate the usual license number. Still another object of my invention is to associate with the automatically controlled signaling means a manually controlled signaling means to indicate the direction in which the vehicle is about to turn.

Features of my invention are its simplicity, cheapness of manufacture and convenience of attachment to existing automobiles.

My invention is hereinafter more fully explained in connection with the accompanying drawings illustrating a preferred embodiment thereof, and the essential characteristics are summarized in the claim.

In the drawings, Figure 1 illustrates my device attached to the rear of an automobile; Fig. 2 is an elevation of the same on an enlarged scale; Fig. 3 is a horizontal longitudinal section of the device; Fig. 4 is a vertical cross section showing a manner of associating the device with the usual license number; and Fig. 5 is a wiring diagram illustrating the manner of controlling the illumination for the various indicators.

In the embodiment of my invention illustrated in the drawings I have provided a long narrow box-like housing comprising a back plate or wall 10 which may be of wood, fiber or other insulating material securely attached to end walls 12, and bottom and top plates 14 and 15 respectively. As shown, the top plate and end walls comprise a single piece of metal having laterally turned flanges 16 and 17 overlapping the front and rear walls respectively. The front wall comprises an outside opaque plate 20 of sheet metal or like material, behind which are arranged plates of glass 21, 22, 23 and 24 extending between transverse partitions 25, 26 and 27 dividing the box into four compartments, each of which contains a lamp for illuminating the respective signal. The bottom of the housing is closed by a single glass plate 30, the bottom plate 14 having a large opening 32 running substantially the whole length of the housing for permitting light from the interior to be projected onto the license number.

The lenses or colored plates 22 and 23 are of different colors, and close openings 28 and 29 in the plate 20, so that one, for example 22, may ordinarily show green when the lamp 35 is lighted, and this lamp preferably remains lighted while the vehicle is running forwardly, thus indicating to drivers in the rear that the vehicle is running forwardly with no abrupt diminution in speed.

It is desirable when the vehicle is to have its speed diminished, abruptly or otherwise, to automatically light the lamp 36 showing light through the glass 23 to suddenly show a red light and at the same time stop showing the green light by automatically shutting off the current from the lamp 35 and sending it to the lamp 36 upon the first movement of the controlling lever actuated to reduce the speed.

When the vehicle is about to be turned, either to the right or to the left, current may be automatically directed through one of the lamps 37 or 38 by manually operating circuits independent of the lamps 35 and 36, which show light through either the glass 24 or 21 and through arrow-shaped openings 40 or 42 through the plate 20 opposite the members 24 and 21 respectively.

The lamps 35, 36, 37 and 38 are preferably all small electric bulbs of a type which may be easily procured, and which may be mounted in sockets indicated at 44, shown as secured to the plate 10 by screws 45 which extend through the plate and also serve for binding-posts indicated at 46 for attaching wires supplying current to the lamps.

The operation of my invention may be best understood by referring to the wiring diagram in Fig. 5 in which 50 indicates a battery, 51 a common wire leading current to each of the lamps through branches 52, 53 and 54, the branch 53 being connected with each of the lamps 35 and 36. 35 is the lamp illuminating the green glass, and its other terminal is connected by a wire 55 to a terminal normally connected with the switch arm 56, connected by a wire 57 with the battery. Thus in normal running of the vehicle current is passing from the batteries through wires 51, and 53 to the lamp 55 and thence through the wire 55 and switch 56 and wire 57 back to the battery.

The switch 56 may be a pivoted member held in contact with the terminal of the wire 55 by a spring indicated at 60, while the switch is connected by a link 61 with a foot-operated lever 62, preferably the clutch pedal of an automobile. On the first forward movement of the clutch pedal 62 (in the direction of the arrow) the switch is brought out of contact with the terminal of the wire 55 onto an arcuate contact plate 64, thus breaking the circuit through the lamp 35 and lighting the lamp 36, the current passing through the wire 53, the lamp 36, a wire 65 leading to the contact 64 and thence through the switch 56 and return wire 57 to the battery. In diminishing the speed of an automobile the clutch pedal is almost always actuated first to throw out the driving clutch, and it will be seen that the first part of this movement will cause the green light to "go out" and will illuminate the red glass indicating to any driver in the rear that the vehicle is to go slower or stop.

To indicate the direction of turning by showing lights through the opening 40 or 42, I have shown a manually controlled switch indicated at 70 and operated to bring it to a contact 72 or 71, causing current to be led through one of the lights 37 or 38. When the switch 70 is in contact with the terminal 71 which is connected with the lamp 38 current is led from the battery through the common wire 51, wire 54 through the lamp and switch to a wire 74 and wire 57 back to the battery. When this switch is in contact with the terminal 72 current is led through the wire 51, branch 52, lamp 37, a wire 75 through the switch and wires 74 and 57 to the battery. This manually controlled switch may be any suitable switching device, such for example, as push buttons arranged on the steering column adjacent the steering wheel of the vehicle.

As a convenient means for mounting the housing above the license number I prefer to provide downwardly extending fingers 80 integral with the bottom plate 14 and adapted to be clamped between the number plate indicated at 85 and its supporting bracket 86, by the usual securing bolts 87. These fingers may be provided with holes 82 registering with the openings in the license number plate, but, to render the device more readily attachable to existing number plates and brackets, I prefer to provide an offset rib 83 in the fingers adapted to rest on the top of the number plate, while the lower edges of the fingers may be curled outwardly, as indicated at 84 below the bracket 86. By this arrangement merely clamping these fingers 80 between the number plate and its supporting brackets in this manner, without regard to the bolt holes, securely holds the housing from being moved upwardly or downwardly by vibration.

In Fig. 1 the device is shown as mounted on the license number plate, secured by a suitable bracket to the mud guard at the rear of the automobile, and at 90 are indicated wires leading forwardly to the switch controlled by the clutch and a manually controlled switch on the steering column indicated in this figure at 70$^a$. In Fig. 3, 51$^a$ and 75$^a$ indicate the wires leading to the several lamps.

It will be seen from the foregoing description that I have provided a compact, simple automobile signaling device which readily lends itself to construction giving an artistic appearance and which may be conveniently mounted on the usual bracket carrying the license number. It is very convenient to operate, as the safety and danger signals are automatic, while the turning signals are very easily controlled by the driver of the vehicle, rendering unnecessary thrusting an arm outwardly from the vehicle to indicate directions of turning. The danger light which remains lighted whenever the clutch is out stays lighted, not only in normal running, but also while the car is standing, thus taking the place of the usual tail ligth. Generally speaking, owing to the convenience and cheapness of my invention, it is a "safety first" automobile signal and is believed to be valuable from this standpoint.

Having thus described my invention, what I claim is:

In a signaling device for indicating the progress of an automobile, the combination of a housing divided into compartments by upright partitions which terminate short of the bottom, a translucent bottom for said housing, means for carrying a license plate beneath the housing, lamps in the different compartments adapted to illuminate the license plate through the translucent bottom, the housing having a rear wall with individual translucent openings opposite the respective lamps.

In testimony whereof, I hereunto affix my signature.

PAUL A. STOVER.